April 14, 1964     H. C. JOHNSON ETAL     3,128,889
MACHINE FOR HANDLING SHINGLES OR SIMILAR SHEET-LIKE PIECES
Filed Jan. 6, 1959     8 Sheets-Sheet 3

INVENTORS
HELGE C. JOHNSON
NORMAN M. ROBINSON
BY
ATTORNEYS

April 14, 1964     H. C. JOHNSON ETAL     3,128,889
MACHINE FOR HANDLING SHINGLES OR SIMILAR SHEET-LIKE PIECES
Filed Jan. 6, 1959     8 Sheets-Sheet 5

INVENTORS
HELGE C. JOHNSON
NORMAN M. ROBINSON
BY
ATTORNEYS

April 14, 1964  H. C. JOHNSON ETAL  3,128,889
MACHINE FOR HANDLING SHINGLES OR SIMILAR SHEET-LIKE PIECES
Filed Jan. 6, 1959  8 Sheets-Sheet 6

Fig. 9.

INVENTORS
HELGE C. JOHNSON
NORMAN M. ROBINSON
BY
Synnestvedt Lechner
ATTORNEYS

United States Patent Office 3,128,889
Patented Apr. 14, 1964

3,128,889
MACHINE FOR HANDLING SHINGLES OR SIMILAR SHEET-LIKE PIECES
Helge C. Johnson, West Chester, and Norman M. Robinson, Parkesburg, Pa., assignors to Certain-Teed Products Corporation, Ardmore, Pa., a corporation of Maryland
Filed Jan. 6, 1959, Ser. No. 785,259
15 Claims. (Cl. 214—6)

This invention relates to a machine for handling shingles or similar sheet-like pieces and is particularly concerned with the provision of apparatus for accepting asphalt shingles as they leave the machine used in their manufacture, collecting them in bundles and then delivering the bundles for wrapping and tying the same. Although many of the features of the invention may have utility in other arts, the machine of the present invention is especially useful in the handling of asphalt shingles and since it was developed for this particular purpose the disclosure of the following specification will be directly related to that purpose as a specific embodiment of the invention.

By way of background it is desired to point out that asphalt shingles are produced on high-speed machines wherein a roll of felt or like material is fed into one end of the machine, is saturated with asphalt, coated with granules and then passed through a cutter which cuts individual shingles from the processed sheet. As normally produced, the individual shingles are cut in rows lengthwise of the sheet of felt and two or more shingles may be cut at one time across the sheet. Furthermore, it is customary to take all of the shingles cut lengthwise of each row and package them in bundles, shingles from various rows not being intermixed in the bundles, and the apparatus of the present invention is adapted to receive shingles from an individual row as they are delivered from the cutting end of the shingle manufacturing machine. It is further customary in the manufacture of shingles to sell them in a group of bundles which are generally referred to as a "square," the aggregate number of shingles in each square being sufficient to cover a given area, usually 100 sq. ft. of roof surface. Obviously, the number of shingles required to cover a given area will vary in accordance with the shingle size. Similarly, the number of bundles in each group as well as the number of shingles in each bundle may vary, and a typical example commonly in use requires 80 shingles to cover 100 sq. ft. of roof surface. Since the shingles are relatively heavy, it is customary to put these 80 shingles or whatever number may be involved into a plurality of bundles, generally three, containing 26, 27 and 27 shingles each. This greatly facilitates packing and handling.

With the foregoing in mind the primary object of the present invention will be better understood and it may be said to reside in the provision of an efficient economical apparatus for continuously receiving shingles from the cutting end of a shingle manufacturing machine and automatically stacking them in bundles and in groups of bundles of the desired number ready for packaging.

Another object is to provide a machine of the character described which can be quickly adapted for receiving and handling shingles of various sizes and designs. In the present disclosure the machine is set up to handle 12" x 36" shingles.

A still further object is to provide a machine of the character described which will count and selectively invert certain of the shingles and deliver them so counted and selectively inverted to a conveyor or other point for suitable packaging.

In attaining the foregoing objectives it is also a part of this invention to provide a completely automatic machine for accomplishing the purposes described above and others which will appear hereinafter including suitable power mechanism for performing the various functions together with indexing mechanism which can be quickly and easily altered to suit individual situations or requirements.

A still further object is to provide a machine which can be operated at high speed with a minimum amount of attention on the part of the operator and also one which will greatly increase the productivity of a plant by freeing it to a large extent of the limitations imposed by the human factor. For example, in this connection, it may be noted that with manual inverting techniques which have heretofore been employed production must be limited to a rate which lies within the capabilities of the individual operator.

How the foregoing objects and advantages together with such others as may appear hereinafter or are incident to our invention are attained is illustrated in preferred embodiments in the accompanying drawings wherein.

Before proceeding to a detailed description of the accompanying drawings we wish to refer briefly to the following factors. Most shingles of the type referred to herein are of much greater dimension in one direction than the other and in the longer direction one edge of each shingle is slotted for a portion of the distance in the other direction which slotting forms what will be referred to as shingle tabs. This is familiar in shingle manufacture and is referred to merely because it has a bearing upon certain details of the apparatus to be described. In packaging the shingles into bundles, also as mentioned above, there may be quite a wide variety of ways in which the shingles are piled. For instance, sometimes every other shingle is inverted. This is especially important in the packaging of shingles one side of which along one edge has been provided with an adhesive material. The adjacent shingle then carries a protective covering which prevents adhering of the shingles while in packages in transit to the job. In situations of this kind it is very convenient to invert every other shingle.

Beyond the foregoing, it is sometimes customary to line up the shingles in each bundle in groups of three— one group having one face up and the next group having the opposite face up. Various combinations of this are also possible and often adopted for particular reasons. Sometimes half the shingles in a bundle will have one face up and the other half the opposite face up. At other times only the first or last shingle in the bundle will be inverted. As will further appear the present invention makes it very easy to pile the shingles in the bundles in any preferred arrangement of shingle inversion.

Referring to the drawings and, in the first instance, especially to FIGURES 1 to 6 inclusive, it will be seen that the shingles coming from the shingle manufacturing machine are delivered lengthwise to a shingle receiving tray. No shingle is shown in FIGURES 1 to 4 inclusive in order to avoid as much confusion in illustration as possible, but in FIGURES 5 and 6 a shingle S is shown in position on the receiving tray 25. The shingles come from the shingle manufacturing machine (not illustrated) on a conveyor 26 (see FIGURE 3) and the first element of the present machine which they strike is the adjustable plate 27 which projects toward the conveyor 26 from a point 28 upon which it is pivoted. As seen to best advantage in FIGURE 3 it is preferred to adjust the plate 27 to a slight angle leading upwardly to the machine of the present invention, for the reason that, in very high-speed operation of the present machine, it is desirable to have the incoming shingles shoot upwardly slightly as they move inwardly to drop down on the shingle receiving tray 25. The reason for this will appear more fully below. The shingles come in lengthwise, as indicated, and drop down upon the tray and each shingle in turn comes up against the trigger plate 29. The trigger plate is mounted to swing on a trunnion shaft 30 which carries a squared portion 31 to the top of which is secured a plate 32. When the trigger 29 is swung to the left as viewed in FIGURE 6 the outer end of the plate 32 swings upwardly against the tension of spring 33 which spring serves to return the parts to the position shown in FIGURE 6. Behind the trigger plate is a pair of rubber bumpers 34 which act as cushions but also as a means for bouncing the trigger and the shingle which moved it back slightly toward the receiving end of the tray. In other words, as each shingle hits the trigger it tends to bounce back slightly and permit the trigger to assume its original position ready for the impact of the next shingle. A trigger switch located in the box 35 is closed when the trigger 29 is actuated by a shingle to lift the plate 32 and when this switch is closed the indexing mechanism illustrated in FIGURES 9 to 13 inclusive is brought into operation. However, the details of this will be described below. Suitable adjustment for the switch is provided by the threaded bolt 36 and nut 37.

Figure 6:
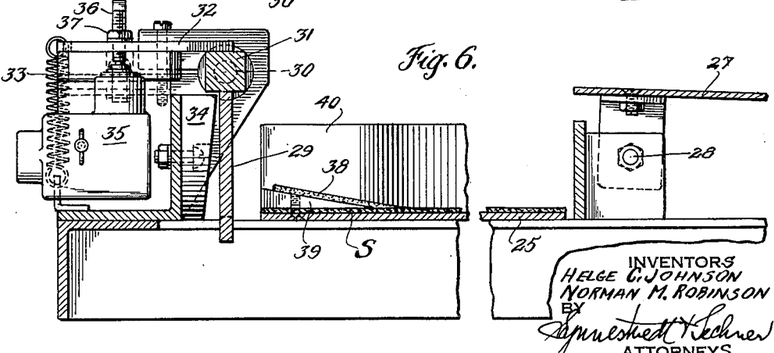
FIGURE 6 is a cross section taken on the line 6—6 of FIGURE 5.
Figure 7:
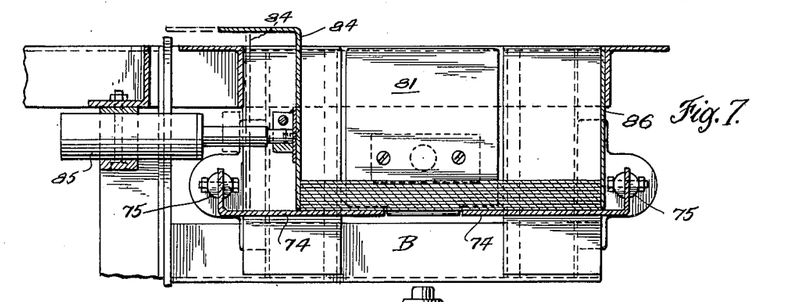
FIGURE 7 is a cross section through a box in which the shingles accumulate in a pile before being discharged from the machine, the view showing certain of the shingle jogging mechanism of the present invention.
Figure 8:
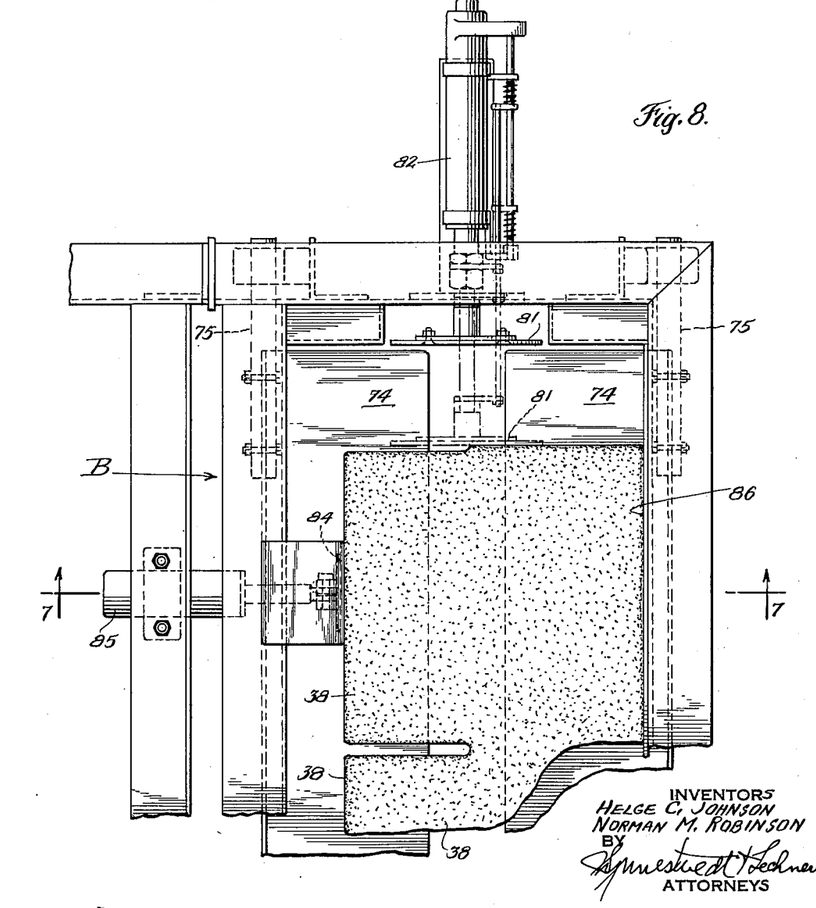
FIGURE 8 is a fragmentary plan view of FIGURE 7.

In the present disclosure the shingles are slotted along one edge to provide shingle tabs 38 in a manner familiar in this art and as the shingles are received on the tray they come in with the tabs always on the same side of the tray. Under each tab is provided an inclined tab lifting pad 39 arranged so that when the shingle comes to rest each tab is inclined upwardly slightly as shown to best advantage in FIGURE 6. This is important when the machine is operating so as to permit a plurality of shingles to accumulate on the tray before they are passed through the machine because the slight upward incline of the tabs 38 as shown in FIGURE 6 prevents the tabs on the succeeding shingle from hooking up or catching on the tabs of the shingles already in place on the tray.

At the far side of the pad 39 which is nearest the trigger 29 (as viewed in FIGURES 3, 5 and 6) we provide a guard plate 40 which is curved outwardly slightly for the purpose of guiding the incoming shingles to their proper position in case they should be delivered from the shingle manufacturing machine at a slight angle. Furthermore, the upper edge of this guard plate is somewhat higher than the pusher plate P to be described hereinafter and its front face (as viewed in FIGURE 2) is very slightly forward of the front face of the pusher.

The pusher P is arranged to move the shingles from the tray to the transfer conveyor C which conveyor carries the shingles in a direction at right angles to the receiving direction and deposits them in shingle box B, the shingles being delivered to the conveyor and traveling thereon with one of their long edges moving forwardly toward the box B.

Figure 1:
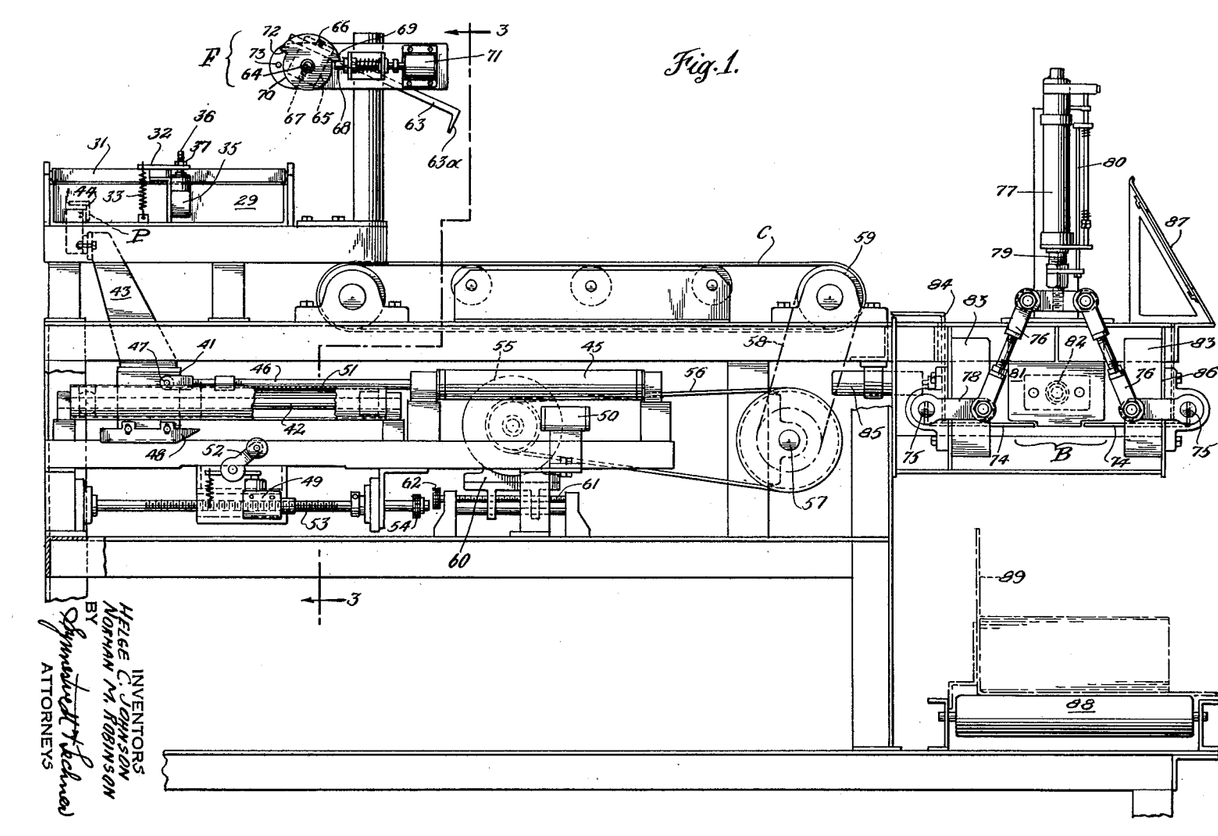
FIGURE 1 is a side elevational view of a machine constructed in accordance with the invention.
Figure 3:
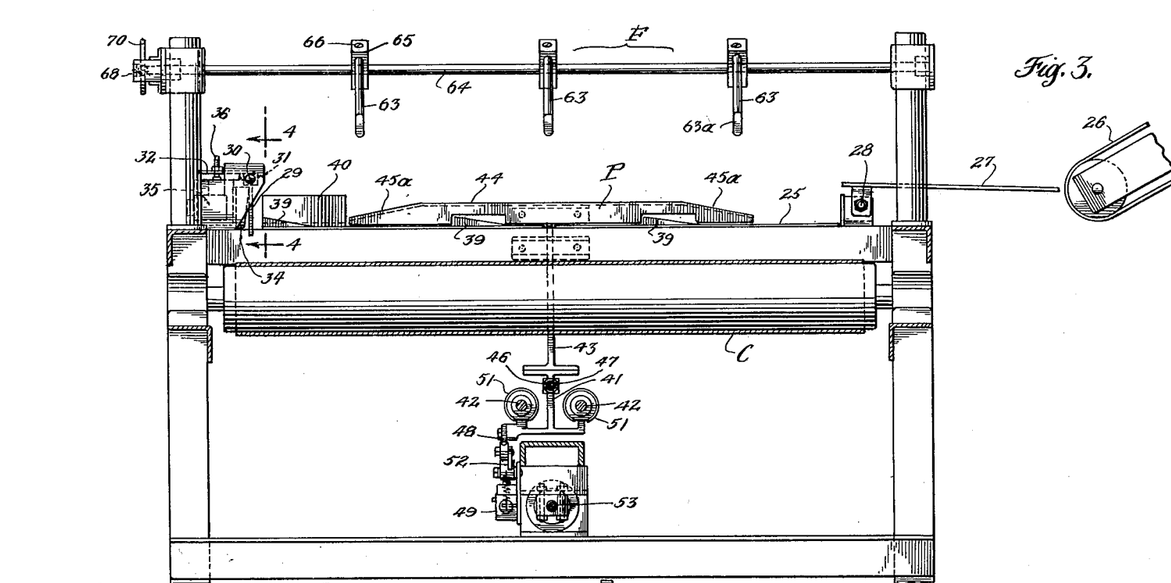
FIGURE 3 is a cross section taken on the line 3—3 of FIGURE 1.
Figure 4:
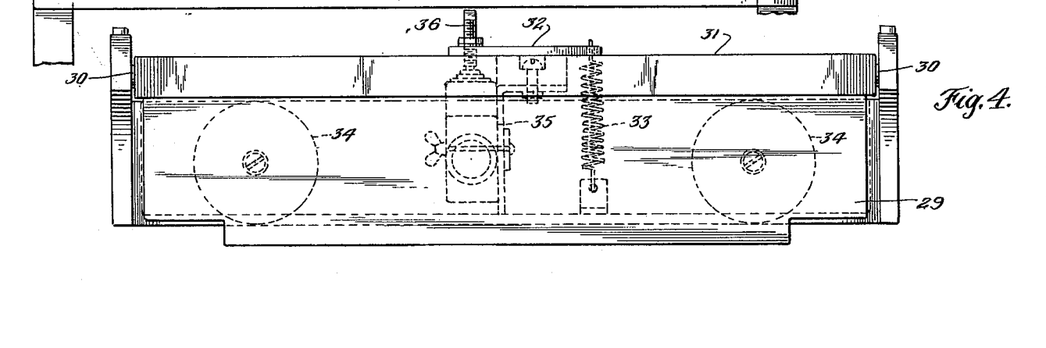
FIGURE 4 is an enlarged face view of a trigger mechanism for initiating step by step operations of the indexing mechanism as will further appear, the view being taken as indicated by the line 4—4 of FIGURE 3.
Figure 5:
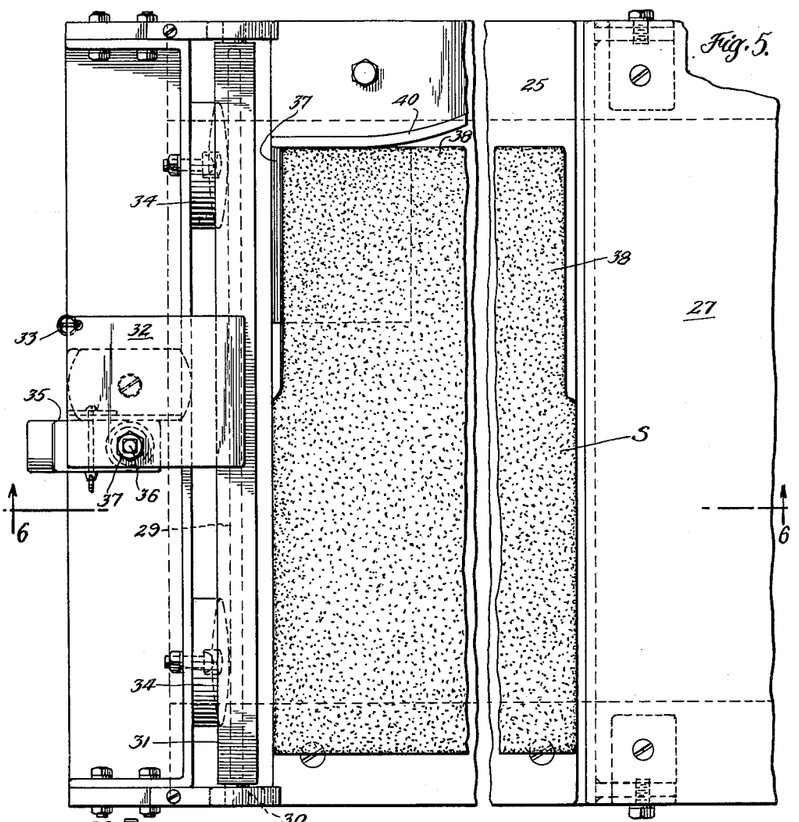
FIGURE 5 is a plan view of the trigger mechanism and of the shingle entrance tray, a portion of the tray being broken out and a shingle being shown in place.

The pusher comprises a supporting member 41 which is slidably mounted on a pair of slide rods 42 (see especially FIGURES 1 and 3). An upright web plate 43 is secured to the supporting member and this plate extends up through a slot in the tray. A shingle contacting pusher member 44 is fastened to the top of the web plate 43 and it will be noticed that the ends of this pusher member are sloped downwardly slightly as at 45a. Upon the receiving end of the machine this slope is particularly important because there are conditions of machine operation wherein the pusher has not completely retracted when another shingle is being received. Under these circumstances the end of the incoming shingle rides up the incline 45a so that shingle hookup is prevented. This will be referred to in more detail later on.

The slidable support member is actuated by an air cylinder 45, the piston rod 46 of which is connected to the slidable support with a pin and clevis connection 47 (see particularly FIGURE 1). The slidable supporting member also carries a cam member 48 for actuating a limit switch 49 which functions to limit the pushing movement of the pusher by actuating a valve 50 which is adapted to cause reverse motion of the piston in the cylinder 45. Piping connections from the valve to the cylinder have been omitted in order to avoid confusion in illustration. Circular guard members 51 cover the slide rods in order to prevent grit or dirt from falling on the rods and interfering with free sliding movement of the pusher.

The position of the limit switch 49 which is actuated by the cam 48 through the intermediation of the lever member 52 can be adjusted on the threaded shaft 53 by means of a chain 54 which passes over a sprocket on the free end of the rod 53, the chain being arranged to pass toward a convenient control point near the operator's station.

Figure 2:
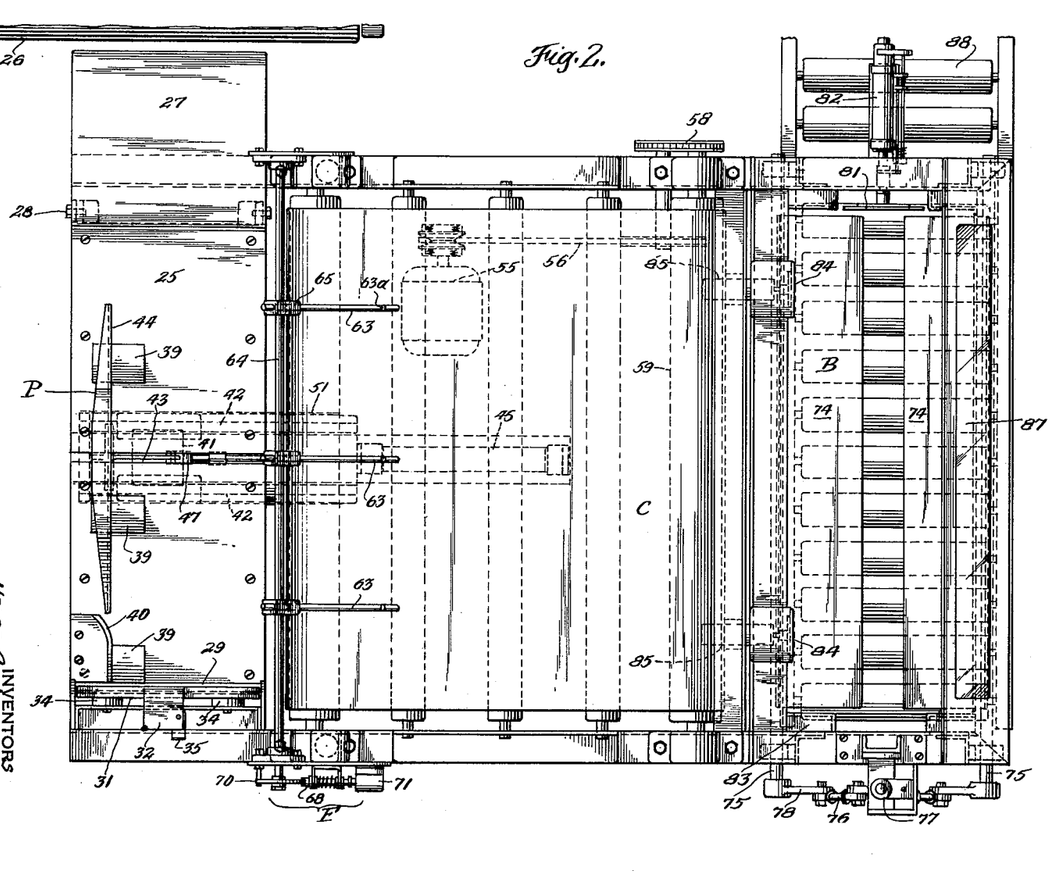
FIGURE 2 is a plan view of FIGURE 1 on a somewhat reduced scale.

The conveyor C is driven by a motor through the belt 56, counter shaft 57 and belt 58, the latter being arranged to rotate the end cylinder 59 as seen to best advantage in FIGURES 1 and 2. The conveyor C is of the endless belt variety and extends from a point adjacent the shingle receiving tray to a point near the box B.

The speed of the conveyor can be adjusted when necessary by moving the motor support 60 back and forth along the screw shaft 61 by means of another chain 62, which latter is also arranged to be convenient to the operator's station. The motor is provided with a variable pitch driving sheave for this purpose, such sheaves being familiar to the art and consisting of two sheave members having angular faces which engage side angle surfaces on the belt. The sheave members are spring-urged toward each other and if the motor is moved to the left (as viewed in FIGURE 2) the belt rides to a smaller diameter on the sheave and slows down the conveyor. These details are not fully illustrated because the principle is well understood by those skilled in the art.

Between the shingle receiving tray 25 and the conveyor C is mounted the shingle flipping or inverting mechanism indicated as a whole by the reference character F. This consists of a series of fingers 63 mounted upon a shaft 64 from which they hang downwardly so that their lower ends can swing across the path of movement of shingles as they advance under the action of the pusher from the receiving tray to the conveyor. The lower ends of the fingers have right angle hook portions 63a. Each finger is mounted on a block 65 by means of a set screw 66 so that the position of the finger may be adjusted in and out with respect to the block. The annular position of the block on the shaft 64 can be adjusted by another set screw 67.

The fingers are held in their upper position (as shown in FIGURE 1) by means of a latch pin 68 which engages the lug 69 on the latch member 70 mounted at one end of the shaft 64. The latch pin 68 can be retracted by the solenoid 71 when the switch which controls the solenoid is closed by the indexing mechanism to be described hereinafter. When the pin 68 is retracted the fingers swing down in front of the advancing edge of the shingles as they are pushed towards the conveyor. The lug 72 on the opposite side of the member 70 is arranged to engage the stop 73 in order to prevent over-riding of the fingers 63 when they move upwardly under the action of the advancing shingles as will further appear.

It will be understood of course that when the leading edge of a shingle engages the fingers 63 under the action of the pusher this leading edge will be raised upwardly as the following edge is pushed forward. When the following edge passes under the leading edge it will of course itself become the leading edge and the former leading edge will drop down onto the conveyor to become the following edge. This operation is more fully illustrated in the diagrams of FIGURES 14 to 19 inclusive, which will be described in more detail in the summary of operation to be given below.

The shingles are discharged from the transfer conveyor C into the box B as already indicated falling by gravity to lie flat on the pivoted gates 74 which form the bottom of the box. There are two of these gate members, one on each long side of the box, and each is pivoted upon a horizontal trunnion 75 with the free edges adjacent to each other so that they can be swung downwardly away from the center of the box to discharge the accumulated bundle of shingles in level condition. The gates are operated by a linkage mechanism 76 actuated by an air cylinder 77. The lower end of each link 76 is pivoted to an arm 78 which is pinned to the trunnion shaft to move with the gate 74. This gate operating mechanism is shown to best advantage in FIGURE 1, and it should be explained that the piston 79 in the air cylinder 77 is connected to the upper ends of the links 76. The cylinder is provided with a suitable air control valve mechanism which is not illustrated in detail since it forms no part of the present invention, power devices of this kind being readily obtainable in the market. Suffice it to say that the piston in the cylinder is under control of the indexing mechanism illustrated in FIGURES 9 to 13 inclusive so that the shingle bundles will be discharged from the box as desired. After discharge the valve of the air cylinder 77 is actuated by a rod member 80 attached to the piston which actuation serves to move the valve to cause return of the piston 79 to the position indicated in FIGURE 1 where the gate members 74 are closed.

While in the box the shingles are jogged edgewise at an end and at a side in order to keep them in proper alignment and this function is also under the control of the indexing mechanism illustrated in FIGURES 9 to 13 inclusive. In the long direction the shingles are jogged edgewise, at one end by means of the linearly movable jogging plate 81 actuated by an air cylinder 82 which is similar to the air cylinder 77 already described in connection with the gate operating means. At the opposite end the shingles abut against stop plates 83. Sidewise, i.e. against the long edge of the shingles, we prefer to provide a pair of spaced, linearly movable, jogging plates 84 each of which is actuated by another air cylinder 85. These side-jogging devices press the shingles against the outside wall 86 of the box.

As inclined shield 87 is provided at the box end of the machine to protect the operator against flying particles which are often thrown from the shingles because of the rapidity with which they are moved. It will be understood, of course, that the operator generally stands at this end of the machine and the shield may be equipped with a safety glass panel if so desired.

When the desired number of shingles have accumulated in the box they are then discharged in the manner described preferably upon a conveyor 88 along which they can be moved out of way of the succeeding bundle. They can be dropped, if desired, into a suitable packaging paper 89 as indicated in dot and dash lines in the lower right hand corner of FIGURE 1. The operator can then fold this paper and tie the bundle or the bundle may be delivered to a wrapping and tying machine not illustrated herein because it forms no part of the present invention.

Figure 12:
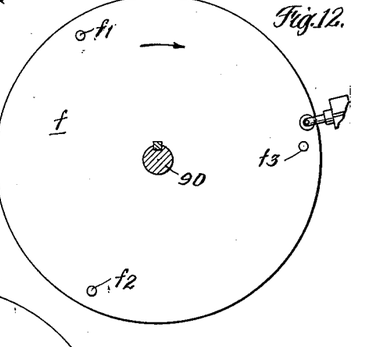
FIGURE 12 is the finger indexing wheel.
Figure 13:
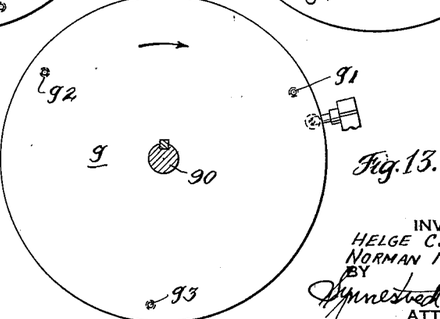
FIGURE 13 is the gate indexing wheel.

The indexing mechanism illustrated in FIGURES 9 to 13 will now be described in greater detail. It consists essentially of a rotatable shaft 90 to which are fixed, to rotate therewith, a series of indexing wheels $p$, $j$, $f$, and $g$. The wheel $p$ controls the operation of the pusher, the wheel $j$ the operation of the jogger mechanism, the wheel $f$ the operation of the finger inverting mechanism and wheel $g$ the operation of the gate discharging mechanism. The wheels are provided with suitable apertures into which may be fitted whatever desired number of control pins may be required to effect the various shingle handling operations already described and in the sequence desired. In the elevational view of FIGURE 10 the pins on the pusher indexing wheel are shown in full lines and are numbered $p$–1, $p$–2, $p$–3 and so forth in succession counter-clockwise of the pusher wheel $p$. The pins on the jogger indexing wheel are numbered $j$-1, $j$-2 and so forth and are seen to best advantage in FIGURE 11. The pins on the finger indexing wheel are marked $f$–1, $f$–2 and so forth as shown in FIGURE 12 and the pins on the gate indexing wheel are marked $g$–1, $g$–2 and so forth as shown in FIGURE 13.

Figure 9:
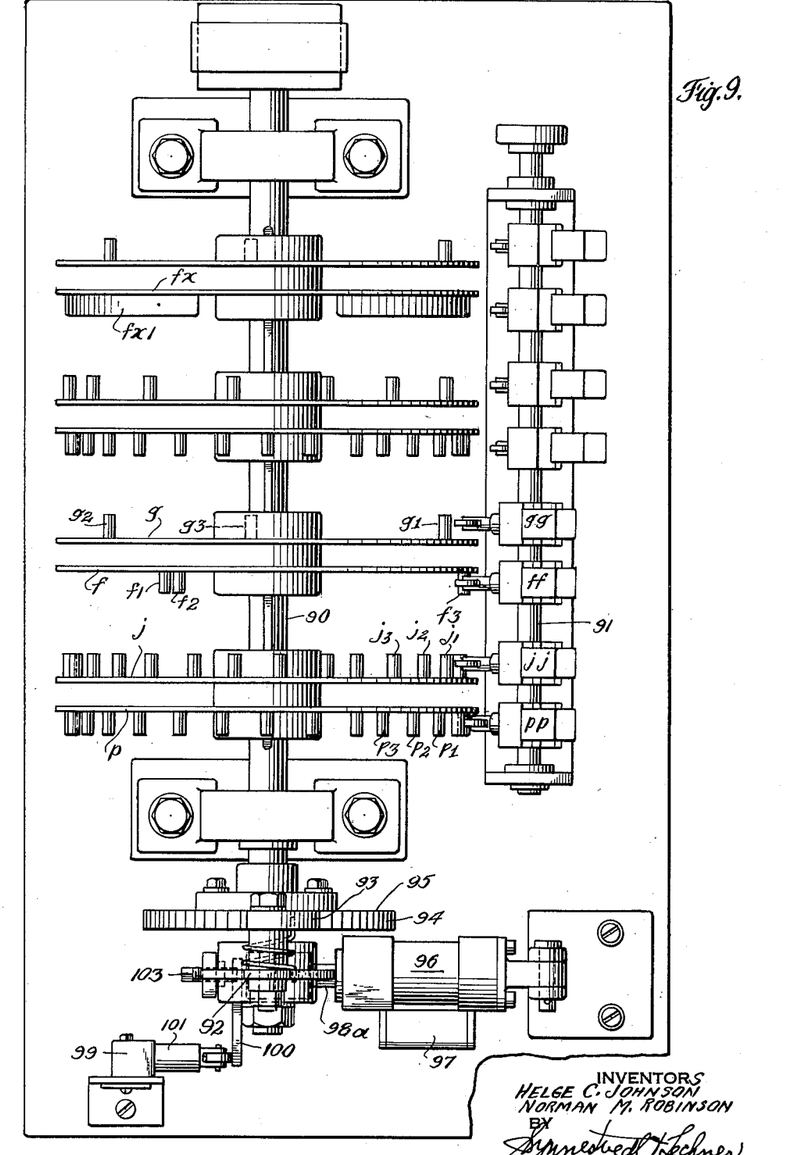
FIGURE 9 is a plan view of the indexing mechanism.

At the right side as viewed in FIGURE 9 is mounted a shaft 91 which carries a plurality of switches $pp$, $jj$, $ff$ and $gg$, each of which has a suitable plunger adapted to be actuated by the pins on its adjacent indexing disc. It will be understood, of course, that when the plunger of any switch is depressed by contact with a pin on the adjacent indexing wheel a circuit is closed which causes the operation of the corresponding part on the machine. For instance, when the pin $p$–1 degresses the plunger of the switch $pp$ the pusher mechanism is actuated to advance the shingle or shingles which may be on the tray to the conveyor C. Similarly, when a jogging index pin depresses the plunger of the switch $jj$ jogging action of the shingles takes place. Depressing the plunger of switch $ff$ releases the finger inverting mechanism so that the fingers fall down into the path of movement of the shingles and cause inversion thereof as already described. Finally, when the plunger of the switch $gg$ is depressed by a pin on the wheel $g$ the gate is opened.

Pivotally mounted on the lower end of the shaft 90 as viewed in FIGURE 9 is an actuating arm 92 which carries an operating pawl 93 adapted to engage the several teeth 94 on the ratchet wheel 95, the latter being mounted on the shaft 90 to rotate therewith. The lower end of the arm 92 (see FIGURE 10) is actuated by an air cylinder 96 under the control of a valve 97 which is operated by a suitable solenoid every time that the trigger plate 29 (FIGURE 6) is moved by an advancing shingle. There is a pivotal connection at 98 between the piston 98a of the air cylinder 96 and the lower end of the arm 92 as seen most clearly in FIGURE 10. When the trigger 29 causes the cylinder 96 to move the arm 92 the pawl 93 advances the ratchet wheel 95 one tooth at a time and all of the attached indexing wheels will move to a similar degree inasmuch as they are all fixed to the shaft 90. In other words, every shingle which is received on the tray actuates the trigger 29 and this in turn moves the indexing mechanism one step in a clockwise direction as indicated by the arrow in FIGURE 10, each step being represented by one of the ratchet teeth 94.

When the arm is moved to effect a one-tooth advance of the indexing mechanism as just described the lower end of the arm closes a switch 99 to energize the solenoid actuated valve 97 to return the pawl 93 sufficiently far to catch the next tooth, the lower end of the arm 92 being provided with a plate member 100 which actuates the plunger mechanism 101 of the switch 99. In the position illustrated in FIGURE 10 a forward motion of the indexing wheels has just been completed, the plunger 101 is depressed and at the next instant the cylinder 96 will return the lever 92 so that the pawl 93 can engage the next tooth counter-clockwise of the ratchet wheel 95. The pawl 102 at the lower side of the ratchet wheel is merely a holding pawl.

Figure 10:
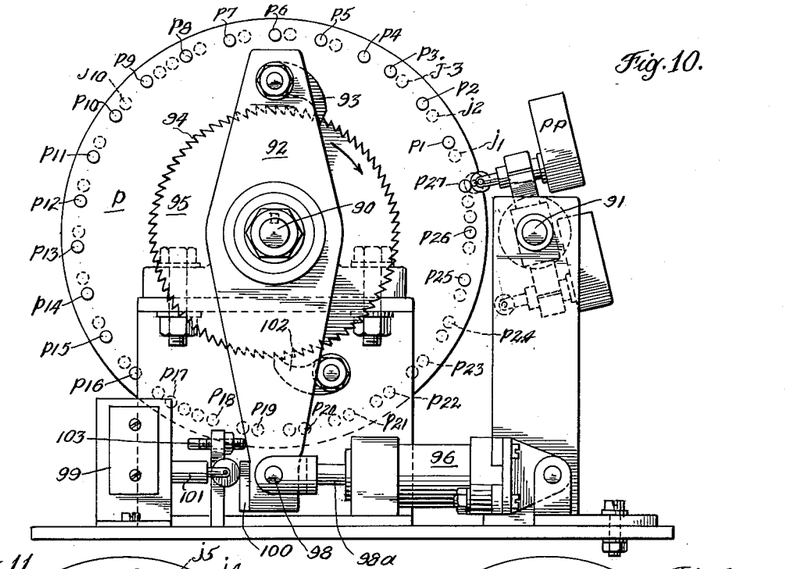
FIGURE 10 is an end elevational view of FIGURE 9.
Figure 11:
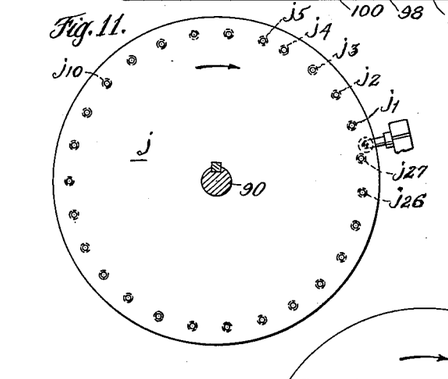
FIGURE 11 is the jogging indexing wheel.

In connection with FIGURE 10 we also wish to point out that a suitable threaded stop pin 103 is provided against which the lower end of arm 92 abuts at the end of the motion which is necessary to advance the mechanism one tooth. It will be understood that in the position of the parts as illustrated in FIGURE 10 the lower end of the arm has just completed its outward stroke and has come up against the pin 103. It will next be retracted.

At this time attention is called to the fact that the indexing mechanism shown in FIGURE 9 has four more indexing wheels than those which have already been described. This is merely to indicate that the indexing device can be conveniently equipped with whatever indexing wheels may be necessary to effect the type of operation which may be desired in the handling of whatever kind of shingles may be passing through the machine at the moment. These additional wheels will not be described in detail because the principles of operation are exactly the same as indicated for the wheels p, j, f and g, except to point out that in some instances a plurality of shingles may be accumulated on the tray before they are pushed to the conveyor by the pusher and all of them may be inverted at once. This makes it possible to allow the fingers 63 to remain in their lowered position while the desired number of shingles are accumulating on the tray. This could be effected by means of an indexing wheel fx on which a series of cam surfaces fx-1 are provided which cams continuously hold the plunger of the adjacent switch in its inward positon. This saves wear and tear on the switch as well as on the finger inverting mechanism.

It should also be noted that the various switches which are actuated by the indexing wheels are mounted on the rock shaft 91 in such a manner as to enable the machine to be set so that one group of switches is in position to be actuated by the indexing wheels while the other group is idle. As will be seen from FIGURES 9 and 10 the shaft 91 is rotated so that the upper group of switches is in position to be actuated by the indexing wheels while the lower group is idle. This avoids unnecessary wear on parts which are not being used at the moment.

*Summary of Operation*

With especial reference to FIGURES 9 to 19 inclusive we now wish to sumarize the operation of our new machine, but before doing so we wish to mention the fact that the shingle inverting fingers 63 are not always employed although in most packaging operations some, at least, of the shingles are inverted. Often every other shingle in a bundle is inverted especially when an adhesive is applied along one edge on one face of each shingle and a removable protective strip on the other face. Sometimes the shingles are inverted in groups of three, while at still other times groups of more than three may be inverted. By a simple rearrangement of the pins in the finger indexing wheel f (FIGURES 9 and 12) the number and sequence of shingles which will be inverted can be varied as desired. In the summary which follows it will be assumed that only the last three shingles in each bundle are inverted and that they are inverted simultaneously as a group. A "square" of the type and size of singles being handled consists of three bundles containing 26, 27 and 27 shingles respectively or a total of 80 shingles. The reason for inverting only the last three shingles is for the purpose of having a smooth side at the top as well as the bottom of each bundle.

Figure 14:
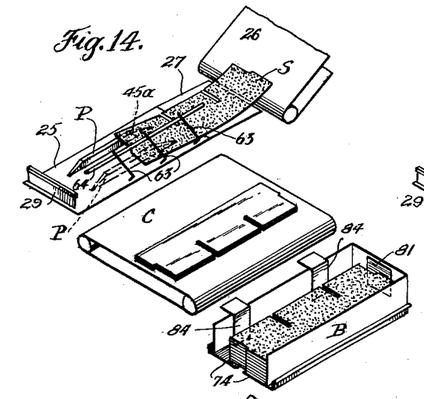
FIGURES 14 to 19 inclusive are diagrammatic isometric views illustrating various operating positions.

With the index wheels in the positions shown in FIGURES 10 to 13, pin p-27 of the pusher control wheel is indexed at the switch which is controlled by the pusher wheel. Closing of the switch has moved the pusher P to the dotted line position shown in FIGURE 14 and this motion of the pusher has advanced the last three shingles of the square, namely the seventy-eight, seventh-ninth and eightieth shingles onto the conveyor C. Twenty-four shingles of a bundle of twenty-seven are already in the box B. The joggers were previously jogged by the pin j-27 of the jogger wheel so that the 24 shingles in the box are in properly aligned position. The inverting fingers 63 are in their upper position clear of the shingles since the pin f-3 of the finger wheel (FIGURE 12) has just passed its switch after operaitng the fingers to turn over the three shingles shown on the conveyor C in FIGURE 14. (In this connection note the fact that the shingle slots are in opposite position with respect to the shingle slots of the first shingle of the next bundle which is being delivered by the conveyor 26 of the shingle manufacturing machine to the receiving tray 25.) The incoming shingle in FIGURE 14 is shown as riding on top of the pusher P and that the shingle is not yet in its final position on the tray. The reason for this is that, in high-speed operation, the pusher does not reach its fully retracted position by the time that the first shingle of the succeeding bundle is advancing to the tray. The inclined top surface 45a of the pusher prevents the shingle from catching on the pusher or, to use the phraseology of the art, it prevents "hook-up" of the shingle on the pusher.

Figure 15:
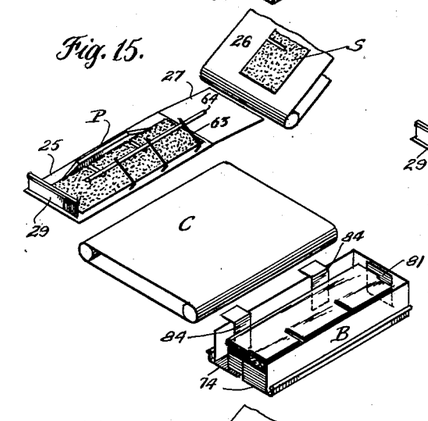

Turning now to FIGURE 15 it will be seen that the shingle which was arriving on plate 25 as shown in FIGURE 14 has now reached its fiinal position on the tray 25 and that the pusher P is fully retracted. At the same time, the three shingles which were on the conveyor C in FIGURE 14 have been moved forward and dropped by gravity into the box B which now contains 27 shingles. At the same time the ratchet wheel of the indexing mechanism has been advanced one step (i.e., one tooth) because the shingle shown in FIGURE 15 as resting on the tray 25 has already actuated the trigger plate 29 which in turn has effected actuation of the soleloid valve 97 so as to admit air to the cylinder 96, moved piston 98a to the left as shown in FIGURE 10 so that the ratchet 93 has turned the indexing shaft 90 in a clockwise direction. However, in FIGURE 15 the fingers 63 are still in their upper position because under the assumption made at the beginning of this summary of operation only the last three shingles are to be inverted as a group. The second shingle of this bundle is now on the delivery conveyor 26. The three shingles just delivered to the box have not yet been jogged to put them in alignment with the rest of the shingles as is indicated in the drawing.

Figure 16:
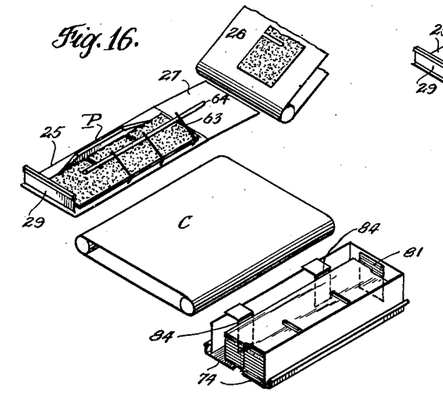

In FIGURE 16 the second shingle of the next bundle has advanced onto the tray on top of the first shingle shown in FIGURES 14 and 15. However, the pusher still remains retracted although the trigger 29 has been actuated by the second shingle and has advanced the ratchet wheel of the indexing mechanism another step so that the pin j-1 of the jogger wheel closes the jogger switch to jog the shingles and bring the last three which were delivered to the box into alignment with the others. At the same time FIGURE 16 shows the third shingle of the next bundle as coming down the conveyor 26 for delivery to the tray 25. The inverting fingers 63 are still in their upper position.

In connection with the summary so far given attention should be called to the fact that the plate 27 is set at a slight upward incline as described earlier in this specification. This aids in giving the rapidly advancing shingles a slight upward motion which is of great help in the avoidance of shingle hook-up. However, the degree of incline of the plate 27 will have to be determined by experimentation in relation to the speed at which the machine is being operated. In fact, under some conditions of operation, the plate 27 may be horizontal.

Figure 17:
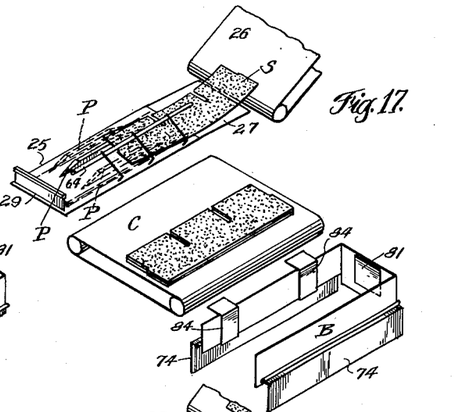

In FIGURE 17 the three shingles of the next bundle have been advanced to the conveyor C and the first shingle of the succeeding bundle is shown as being delivered from the conveyor 26 to the tray 25. The pusher P has not quite returned to its fully retracted position and the inverting fingers 63 are in their upper position because the group of three shingles on the conveyor C in FIGURE 17 are not to be inverted. The slots in the shingles in FIGURE 17 therefore are shown in the same direction. It should also be noted that the last of the three shingles on conveyor C in FIGURE 17 performed its function of moving the trigger and causing the ratchet wheel to advance another step. This caused the pusher to move to the advanced dotted line position which caused the group of three shingles to move onto the conveyor C. When the ratchet wheel was thus rotated it also moved the pin g–1 of the gate wheel (see FIGURE 13) to the position where it closes the gate switch thus opening the gates 74 and dumping the bundle of 27 shingles.

As the operation continues the fourth, fifth and sixth shingles and the seventh, eighth and ninth shingles move to the tray, are pushed onto the conveyor in groups of three and are delivered into the box. The tenth shingle, through the usual trigger, advances the ratchet wheel another tooth or step and the eleventh shingle again moves the trigger to advance the indexing mechanism still another step and at the same time moves the pin p–4 of the pusher wheel to the switch which it controls and also moves the pin j–4 of the jogger wheel to the switch which it controls so that at this point in the cycle the pusher and the jogger operate simultaneously. The reason for this is that in the first bundle of any square only 26 shingles are packed or at least we prefer to operate the machine in this way although it will be understood that the bundle containing 26 shingles could be either the first bundle, the second bundle or the third bundle as may be preferred.

It is now desired to call attention to the fact that the pins p–3 and p–4 of the pusher wheel are spaced only two spaces apart while all the others are three spaces apart. The reason we have done this is because we have elected this particular point in the cycle for the two shingle delivery although it will be understood that it could be at any other point in the cycle if so desired. Following this the succeeding shingles, namely the twelfth, thirteenth and fourteenth; the fifteenth, sixteenth and seventeenth; the eighteenth, nineteenth and twentieth and the twenty-first, twenty-second and twenty-third all proceed through the machine in accordance with the description already given. In each group of three shingles each shingle of the group moves the ratchet wheel of the indexing mechanism one step forward, step one being an idle step, step two actuating the jogger and step three actuating the pusher. Diagrams for shingles 4 to 23 of a bundle of 26 have not been included because it would constitute merely an unnecessary repetition in the showing.

At this point it should be explained that to advance the shingles in groups of three is a convenient method of operation but it will be understood, of course, that the shingles could be advanced singly or in groups containing a number other than three as may be convenient or desired for any particular type of packaging operation.

Figure 18:
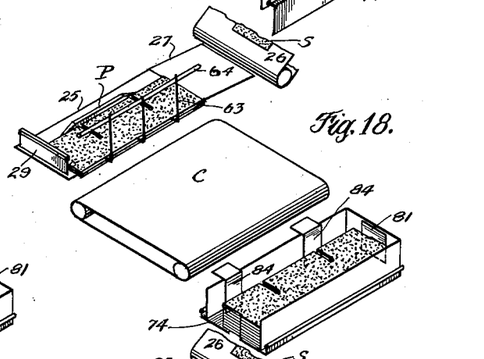
Figure 19:
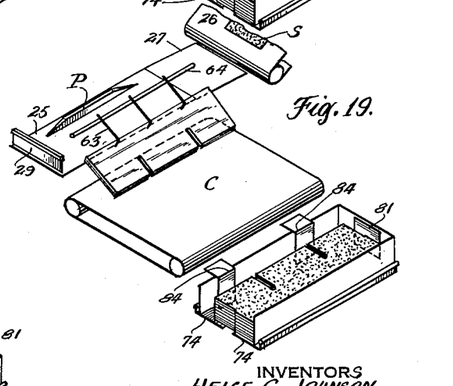

Turning now to FIGURE 18, the twenty-fourth shingle, when hitting the trigger, moves the pin f–1 of the finger wheel to the switch which it controls and closes the same to release the finger latch 68 from the shoulder 69 and thereby permit the fingers to drop to the position shown in this figure where they lie in the path of movement of the shingles. When the twenty-fifth shingle moves the ratchet wheel another tooth or step the finger latch 68 moves back to its latching position and the pin j–9 of the jogger wheel actuates its switch to effect the jogging action. When the twenty-sixth shingle hits the trigger, pin p–9 of the pusher wheel moves to its switch and closes it to advance the pusher. The leading edge of the three shingles engages the lowered fingers as shown in FIGURE 18 and as the pusher advances these three shingles the fingers swing up with the leading edge of the shingles caught on the hook 63a. In this way the leading edge of this group of shingles is lifted upwardly and as the shingles move past their vertical position the trailing edge falls onto the conveyor to become the leading edge as shown in FIGURE 19, the shingles having fallen by gravity to lie flat on the conveyor in their flipped or inverted position. This is shown by the shingle slots in FIGURE 19.

The first shingle of the next bundle advances the ratchet wheel one step as before, the second shingle activates the joggers through the pin j–10 of the jogger wheel and at this point the finger latch 68 is released so it will return to its latching position and the third shingle actuates the pusher through the pin p–10 of the pusher wheel and the gate mechanism through the pin g–2 of the gate wheel thus unloading the bundle of twenty-six shingles.

Operation then proceeds in the three shingle grouping already described and this continues for the next twenty-four shingles and then the twenty-fifth shingle through pin f–2 of the finger wheel permits the fingers to drop, the twenty-sixth shingle through pin j–18 of the jogger wheel actuates the joggers and the twenty-seventh shingle through pin p–18 of the pusher wheel actuates the pusher. The first shingle of the next bundle again advances the indexing mechanism by one step, the second shingle through the jogger pin j–19 causes the jogging, the third shingle through the pusher pin p–19 actuates the pusher and at the same time, through gate pin g–3, the gates are opened to drop the batch of twenty-seven shingles out of the box.

Similar action in groups of three takes place until the next twenty-seven shingles are delivered to the box and then the third shingle of the first bundle of the next square of 80 shingles through the medium of the gate pin g–1, dumps the completed bundle of twenty-seven shingles from the box. In this way three bundles of shingles, the first containing twenty-six shingles and the second and third twenty-seven shingles each, have been delivered by the machine and the eighty shingles constituting the square have been accurately counted and all of this has taken place without the need for any attention on the part of the operator. One cycle of operation has been completed and the machine is ready to go forward on the next cycle which is merely a repetition of the one already described.

Although it is believed to be perfectly obvious we should point out that the indexing mechanism of FIGURES 9 and 10 can very readily be fitted with other index wheels adapted to give various types of operation. This has already been referred to but we wish to add that when every other shingle is to be inverted we prefer to package them in three bundles containing 26 shingles, 26 shingles, and 28 shingles. In some instances the first nine shingles and the last nine shingles may be inverted and in situations of this kind a finger wheel like the finger wheel fx can be supplied which would carry cams fx–1 of a length suitable for permitting the inverting fingers to hang in their lower position during the time necessary to feed nine shingles to the receiving tray. A suitable gap between such cams is, of course, required to permit the finger latch to return to its latching position. Many other combinations can be adopted and the indexing device is designed to take care of two or more different types of operation. Furthermore, the switches which are controlled by the indexing wheels can be mounted, as shown, so that one group can be rocked into position while the other group is idle—thus saving wear and tear on the group which is not required for the particular operation in hand. This is more practical than it would be to disconnect the wiring or provide supplemental switches in the circuits designed to cut out the circuit because such a scheme would still leave the switches in position to be constantly actuated even though they were performing no function at the moment.

We would like to call attention to the fact that in FIGURES 1 and 2 we have indicated a roller conveyor to which the shingles drop when they leave the box and in FIGURE 1 we have indicated a suitable wrapper on this roller conveyor in dot and dash lines. These are details which form no part of the present invention but have been included to show how conveniently our machine may be fitted into a shingle producing and packaging operation.

We would also like to point out that, while in no sense essential, we prefer to operate the end and the side jogger plates successively. This is done by passing the air from the end jogger cylinder to the side jogger cylinder so that the end jogger is the first to jog the shingles in the box after which the side joggers come into play. This is only a detail but is included so that the disclosure will be more fully understood.

In conclusion we would like to explain that our improved packaging machine can be operated at various speeds and that quite high speeds can be attained within reasonable limits which will be apparent to those skilled in this art. In high-speed operation the flipping or inverting action is sometimes so rapid that the shingles may turn over and drop onto the conveyor C without depending on the forward movement of the conveyor to pull the lower edge of the shingles forwardly, i.e. it sometimes happens under high-speed conditions that the shingles are actually thrown through the air and land flat on the conveyor at a somewhat advanced point. However, in slower operation the lower edge of the shingles actually drops onto the conveyor and the advancing movement of the conveyor pulls the bottom edge forwardly and then the shingle falls flat to the surface of the conveyor.

We claim:

1. A machine for handling shingles or similar sheetlike pieces comprising a tray for receiving shingles from one direction, a shingle assembly box spaced therefrom, a conveyor for transferring shingles in a direction transverse the receiving direction from the tray to the box where they accumulate in a pile, a reciprocating pusher for moving shingles in the same transverse direction from the tray to the conveyor, and a shingle flipping finger mounted above the plane of the conveyor upon a pivot shaft from which it is adapted to hang downwardly with its lower end across the path of shingle movement as the shingles travel from the tray to the box, said lower end being adapted to engage the leading edge of a shingle, latch means normally holding said finger out of the path of shingle movement, means for releasing said latch means to permit engagement with a selected shingle, said finger when released and engaged by a shingle being adapted to be swung by the shingle and to guide said leading edge upwardly as the shingle moves from the tray to the box whereby to permit the following edge to pass under the leading edge and itself become the leading edge and then to allow the shingle to fall to the conveyor for delivery to the box in inverted position.

2. A machine for handling shingles or similar sheetlike pieces comprising a tray for receiving shingles from one direction, a conveyor adjacent said tray for carrying shingles away from said tray in a direction transverse the receiving direction, a reciprocating pusher for moving shingles in the same transverse direction from the tray to the conveyor, and a shingle flipping finger mounted above the plane of the conveyor upon a pivot shaft from which it is adapted to hang downwardly with its lower end across the path of shingle movement as the shingles travel from the tray to the conveyor, said lower end being adapted to engage the leading edge of a shingle, latch means normally holding said finger out of the path of shingle movement, means for releasing said latch means to permit engagement with a selected shingle, said finger when released and engaged by a shingle being adapted to be swung by the shingle and to guide said leading edge upwardly as the shingle moves from the tray toward the conveyor whereby to permit the following edge to pass under the leading edge and itself become the leading edge and then to allow the shingle to fall to the conveyor in inverted position.

3. A shingle handling machine according to claim 2 which includes power means for moving the pusher, indexing means for causing actuation of said pusher power means in predetermined relation to the number of shingles received on the tray, power means for advancing the indexing means one step at a time, and trigger mechanism for effecting actuation of said indexing power means, said trigger mechanism being moved by each shingle received on the tray whereby the indexing means is advanced one step by each shingle.

4. A shingle handling machine according to claim 3 wherein the indexing means may be set so as to permit a desired plurality of shingles to accumulate in a pile on the tray to be moved by the pusher as a group.

5. A shingle handling machine according to claim 1 which includes linearly movable members for jogging the shingles edgewise in the box whereby to insure alignment of the shingles in the pile.

6. A shingle handling machine according to claim 5 which is provided with power means for actuating the jogging members and wherein the indexing means includes means for effecting the jogging in desired relation to the number of shingles accumulated in the shingle assembly box.

7. A shingle handling machine according to claim 1 which includes linearly movable members for jogging the shingles edgewise in the box whereby to insure alignment of the shingles in the pile, a pair of gate members in the bottom of the box upon which the pile of shingles rests, each gate member being pivoted along its outer edge with the free edges adjacent to each other, together with power means for actuating the pusher, power means for actuating the jogging members, power means for simultaneously opening the gate members, indexing means for effecting actuation of said several power means in selectively predetermined relation to the number of shingles received on the tray and trigger mechanism which is adapted to be moved by each shingle received on the tray, whereby the indexing means is advanced one step by each shingle.

8. A machine for handling shingles of the type which have slots along one edge providing spaced tabs, comprising a tray onto which the shingles are slid in a direction transverse the slots, a conveyor adjacent thereto, a pusher for moving shingles from the tray to the conveyor in a direction parallel to said slots, power means for actuating the pusher, indexing means for selectively effecting movement of the pusher in predetermined relation to the number of shingles received on the tray whereby a desired plurality of shingles may accumulate in a pile on the tray and then be moved by the pusher to the conveyor at the same time, inclined tab-lifting surfaces on the tray over which the shingle tabs ride as the shingles are received on the tray whereby the tabs on shingles already in place in the pile on the tray do not obstruct the tabs of the shingles which follow, and trigger mechanism for initiating actuation of said indexing means, said trigger mechanism being moved by each shingle received on the tray to advance the indexing means by one step.

9. A shingle handling machine according to claim 8 wherein the shingles are delivered to the tray over an entrance plate which is preferably upwardly inclined whereby to cause the shingles advancing onto the tray to clear the pusher.

10. A machine for receiving, counting, inverting, stacking and delivering bundles of shingles for packaging, comprising a tray on which the shingles are received in substantially horizontal position from one direction, a box for collecting the shingles in stacked bundles, a conveyor for moving the shingles horizontally from the tray to the box, a pusher which moves the shingles from the tray to the conveyor in a direction transverse the receiving direction, mechanism for jogging the shingles edgewise in the box whereby to align the shingles in the stack, a gate at the bottom of the box for discharging the bundle, a shingle flipping finger pivoted to swing into the path of shingle movement to engage the leading edge of the shingles, releasable means for holding said finger out of the path of shingle movement, said finger being adapted to guide said leading edge upwardly as the shingles are pushed from the tray toward the conveyor whereby to enable the following edge to pass under the leading edge and itself become the leading edge and then to allow the shingles to fall to the conveyor for delivery to the box in inverted position, actuating power means for each of said conveyor, said pusher, said jogging mechanism, and said gate and for releasing said flipping finger holding means to permit the finger to swing into operative position, indexing means for preselecting and repeating a desired sequence of shingle receiving, inverting, conveying, jogging, and bundle discharging operations, and trigger mechanism for initiating actuation of said indexing means, said trigger mechanism being moved by each shingle received on the tray to advance the indexing means by one step.

11. A machine for handling shingles or similar sheet-like pieces comprising a shingle receiving tray, a shingle assembly box spaced therefrom, a conveyor for transferring shingles from the tray to the box where they accumulate in a pile, a pusher for moving shingles from the tray to the conveyor, pusher and said conveyor being arranged to move the singles laterally toward the box, power means for actuating the pusher, a pair of gate members in the bottom of the box upon which the pile of shingles rests, each gate member being pivoted along its outer edge with the free edges adjacent to each other, power means for simultaneously opening the gate members to permit level discharge of the shingles accumulated in the box, rotatable indexing means for determining the timing and sequence of operation of said two power means, power means for rotating the indexing means, and trigger mechanism actuated by the shingles as they are received on the tray, said trigger mechanism being adapted to initiate operation of the power means for rotating the indexing means.

12. A shingle handling machine according to claim 11 having, in addition, linearly movable members for jogging the shingles edgewise in the box whereby to insure alignment of the shingles in the pile, together with power means therefor also under the control of the indexing means.

13. A machine for handling shingles or similar sheet-like pieces comprising a shingle receiving tray, a shingle assembly box spaced therefrom, a conveyor for transferring shingles from the tray to the box where they accumulate in a pile, a pusher for moving shingles from the tray to the conveyor, said pusher and said conveyor being arranged to move the shingles laterally toward the box linearly movable members for jogging the shingles edgewise in the box whereby to insure alignment of the shingles in the pile, a pair of gate members in the bottom of the box upon which the pile of shingles rests, each gate member being pivoted along its outer edge with the free edges adjacent to each other, power means for actuating the pusher, power means for actuating the jogging members, power means for simultaneously opening the gate members, indexing means for effecting actuation of said several power means in selectively predetermined relation to the number of shingles received on the tray, and trigger mechanism adapted to be moved by each shingle received on the tray whereby the indexing means is advanced one step by each shingle.

14. A shingle handling machine according to claim 7 wherein the shingle flipping finger is provided with releasable means for holding the finger out of the path of shingle movement and further wherein the indexing means includes means for releasing said finger in selectively predetermined relation to the number of shingles received on the tray.

15. A machine for handling shingles or similar sheet-like pieces comprising a tray for receiving the shingles, a conveyor adjacent said tray for carrying the shingles along a substantially horizontal path of travel to a point of disposal, a reciprocating pusher for moving shingles from the tray to the conveyor, a shingle flipping finger mounted above the path of shingle movement upon a pivot shaft from which it is adapted to hang downwardly with its lower end across the path of shingle movement to engage the leading edge of a shingle, latch means normally holding said finger out of the path of shingle movement, means for releasing said latch means to permit said finger to engage selected shingles, and indexing means adapted to effect said release, said finger when released and engaged by a shingle being adapted to be swung by the shingle and to guide said leading edge upwardly as the shingle moves along its path of travel whereby to permit the following edge to pass under the leading edge and itself become the leading edge and then to allow the shingle to fall by gravity back into its substantially horizontal path of travel.

References Cited in the file of this patent

UNITED STATES PATENTS

| | | |
|---|---|---|
| 1,389,794 | Thiele et al. | Sept. 6, 1921 |
| 1,569,033 | Reichel | Jan. 12, 1926 |
| 1,600,958 | Hart | Sept. 21, 1926 |
| 1,871,156 | Clause | Aug. 9, 1932 |
| 2,128,316 | Paul | Aug. 30, 1938 |
| 2,508,368 | Borkmann | May 23, 1950 |
| 2,606,483 | Forbes | Aug. 12, 1952 |
| 2,612,984 | Alden | Oct. 7, 1952 |
| 2,825,475 | Roberts | Mar. 4, 1958 |
| 2,967,630 | Parker | Jan. 10, 1961 |
| 2,984,838 | Parker | May 23, 1961 |
| 3,067,853 | Carson | Dec. 11, 1962 |

FOREIGN PATENTS

| | | |
|---|---|---|
| 90,083 | Norway | Nov. 18, 1957 |